United States Patent
Katagiri et al.

(10) Patent No.: US 11,740,502 B2
(45) Date of Patent: Aug. 29, 2023

(54) EXTERNAL LIGHT USE TYPE DISPLAY BODY

(71) Applicant: LINTEC CORPORATION, Tokyo (JP)

(72) Inventors: Baku Katagiri, Tokyo (JP); Kentaro Kusama, Tokyo (JP); Tatsuki Kuramoto, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 17/708,133

(22) Filed: Mar. 30, 2022

(65) Prior Publication Data

US 2022/0317507 A1  Oct. 6, 2022

(30) Foreign Application Priority Data

Mar. 31, 2021  (JP) .................................. 2021-059398

(51) Int. Cl.
*G02F 1/1335* (2006.01)
*G02B 5/02* (2006.01)

(52) U.S. Cl.
CPC ..... *G02F 1/133504* (2013.01); *G02B 5/0215* (2013.01); *G02F 1/133553* (2013.01)

(58) Field of Classification Search
CPC ............................................... G02F 1/133504
See application file for complete search history.

(56) References Cited

U.S. PATENT DOCUMENTS

| 2014/0285757 A1* | 9/2014 | Tamaki ............. G02F 1/133707 349/113 |
| 2016/0077246 A1 | 3/2016 | Kusama et al. |

FOREIGN PATENT DOCUMENTS

| CN | 111247483 A * | 6/2020 | ............. B60K 35/00 |
| JP | 6250648 | 12/2017 | |

\* cited by examiner

*Primary Examiner* — Edmond C Lau
(74) *Attorney, Agent, or Firm* — GREENBLUM & BERNSTEIN, P.L.C.

(57) ABSTRACT

An external light use type display body including: a light diffusion control layer; a display layer; and a reflective layer. The light diffusion control layer has a regular internal structure that comprises a plurality of regions having a relatively high refractive index in a region having a relatively low refractive index. The reflective layer has a patterned indented structure when at least one cross section cut in a thickness direction is viewed. When the entrance plane is irradiated with light rays that travel on the light ray traveling plane with a predetermined incident angle while being scanned along an intersection line of the light ray traveling plane and the entrance plane, the ratio of the light rays satisfying the following Formula (1) or Formula (2) is 50% or more.

$$\theta_{id} < \theta_{dd-} \leq \theta_{od} \leq \theta_{dd+} \quad (1)$$

$$\theta_{dd-} \leq \theta_{id} \leq \theta_{dd+} < \theta_{od} \quad (2)$$

10 Claims, 4 Drawing Sheets

EXTERNAL LIGHT USE TYPE DISPLAY BODY

TECHNICAL FIELD

The present invention relates to an external light use type display body that exhibits a predetermined display function using light incident from outside.

BACKGROUND ART

Conventional display bodies used as signboards or indicators include those configured such that characters and/or images are printed on surfaces having reflectivity and those configured such that transparent or translucent films on which characters and/or images are printed are bonded to surfaces having reflectivity. In addition, some display bodies such as liquid crystal display devices and electronic paper may be provided with reflective layers.

In such an external light use type display body, the display surface is illuminated with a light source such as an indoor light or the sun and/or an auxiliary light source provided on the display surface side of the display body, and the reflective surface or reflective layer reflects the light from these light sources thereby to allow the display to be visually recognized.

When using the external light use type display body, the positional relationship between the light source and the viewer is usually not fixed due to the use of an external light source. This may result in a problem in that, depending on the position of the light source, insufficient light reaches the viewer to deteriorate the visibility and the entire display body cannot be illuminated brightly.

To solve the above problem, it is conceivable to incorporate a light diffusion plate into the display body. However, simply incorporating a general light diffusion plate may lead to another problem in that the diffusivity necessary for good visibility cannot be sufficiently obtained and, if attempting to achieve wide diffusion, light loss due to stray light or backscattering occurs to impair the image clarity. From the viewpoint of solving these problems, in the external light use type display bodies, it is considered that a light diffusion control layer that can transmit and diffuse the incident light within a predetermined incident angle range in a strong and low light loss state is provided between the surface on the viewer side and the reflective layer (e.g., Patent Document 1). The existence of the above light diffusion control layer allows the light reflected from the reflective layer to be moderately diffused, and the deterioration in the visibility depending on the position of the light source can thus be reduced.

PRIOR ART DOCUMENTS

Patent Documents

[Patent Document 1] JP6250648B

SUMMARY OF THE INVENTION

Problems to be Solved by the Invention

While the visibility is improved to some extent by using the above-described light diffusion control layer, there is a need to achieve brighter and more uniform visibility.

The present invention has been made in consideration of such actual circumstances and an object of the present invention is to provide an external light use type display body that exhibits excellent visibility.

Means for Solving the Problems

To achieve the above object, first, the present invention provides an external light use type display body comprising: a light diffusion control layer; a display layer; and a reflective layer, the light diffusion control layer, the display layer, and the reflective layer being laminated in this order or the display layer, the light diffusion control layer, and the reflective layer being laminated in this order, the light diffusion control layer having a regular internal structure that comprises a plurality of regions having a relatively high refractive index in a region having a relatively low refractive index, the reflective layer comprising a patterned indented structure when at least one cross section cut in a thickness direction is viewed, the patterned indented structure having a surface that constitutes a reflective surface, wherein provided that a surface of the external light use type display body on a side distal to the reflective layer is defined as an entrance plane and a plane including a normal line of the entrance plane and a diffusion central axis of the light diffusion control layer is defined as a light ray traveling plane, an angle formed between a light ray traveling on the light ray traveling plane and the normal line of the entrance plane is assigned with a negative sign when the light ray is incident from a main inclination direction side of the patterned indented structure or exits toward the main inclination direction side with reference to the normal line of the entrance plane, while in an opposite case, the angle is assigned with a positive sign, wherein provided that when a position on the patterned indented structure in the thickness direction of the reflective layer is differentiated at a position in an in-plane direction of the reflective layer with respect to a cross section of the patterned indented structure obtained by cutting on the light ray traveling plane and an inclination direction of a fine surface in the patterned indented structure is classified in accordance with whether the differential value is a positive value or a negative value, the main inclination direction of the patterned indented structure means a more frequent inclination direction, wherein when the entrance plane is irradiated with light rays that travel on the light ray traveling plane with a predetermined incident angle while being scanned along an intersection line of the light ray traveling plane and the entrance plane, a ratio of the light rays satisfying following Formula (1) or Formula (2) is 50% or more, $$\theta_{id} < \theta_{dd-} \leq \theta_{od} \leq \theta_{dd+} \quad (1)$$

$$\theta_{dd-} \leq \theta_{id} \leq \theta_{dd+} < \theta_{od} \quad (2)$$

where the $\theta_{id}$ means an angle of the light ray directed from the entrance plane toward the reflective layer with reference to the normal line of the entrance plane immediately after being incident on the light diffusion control layer and is −35° or −25°, the $\theta_{od}$ means an angle of the light ray reflected from the reflective layer and directed toward the entrance plane with reference to the normal line of the entrance plane immediately after being incident on the light diffusion control layer, and the $\theta_{dd-}$ and $\theta_{dd+}$ are defied as angles of a lower limit and an upper limit of a diffusion angle range of the light diffusion control layer, respectively, which are converted to angles in the light diffusion control layer with consideration for refraction occurring at an interface between air and the light diffusion control layer, wherein the diffusion angle range refers to a range of an incident angle at which a haze value is 90% or more when light rays are sequentially incident on one surface of the light diffusion control layer alone within a range of the incident angle of −90° to 90° and the haze value of transmitted light is measured at another surface (Invention 1).

In the external light use type display body according to the above invention (Invention 1), the above-described light diffusion control layer and the above-described reflective layer are laminated so as to satisfy the condition of the above Formula (1) or Formula (2), and the incident light can thereby be well reflected toward a viewer. As a result, the viewer can visually recognize the bright and uniform display.

Second, the present invention provides an external light use type display body comprising: an auxiliary light source; a light diffusion control layer; a display layer; and a reflective layer, the auxiliary light source, the light diffusion control layer, the display layer, and the reflective layer being laminated in this order or the auxiliary light source, the display layer, the light diffusion control layer, and the reflective layer being laminated in this order, the auxiliary light source irradiating the display layer with light rays, the light diffusion control layer having a regular internal structure that comprises a plurality of regions having a relatively high refractive index in a region having a relatively low refractive index, the reflective layer comprising a patterned indented structure when at least one cross section cut in a thickness direction is viewed, the patterned indented structure having a surface that constitutes a reflective surface, wherein provided that a surface of the external light use type display body on a side distal to the reflective layer is defined as an entrance plane and a plane including a normal line of the entrance plane and a diffusion central axis of the light diffusion control layer is defined as a light ray traveling plane, an angle formed between a light ray traveling on the light ray traveling plane and the normal line of the entrance plane is assigned with a negative sign when the light ray is incident from a main inclination direction side of the patterned indented structure or exits toward the main inclination direction side with reference to the normal line of the entrance plane, while in an opposite case, the angle is assigned with a positive sign, wherein provided that when a position on the patterned indented structure in the thickness direction of the reflective layer is differentiated at a position in an in-plane direction of the reflective layer with respect to a cross section of the patterned indented structure obtained by cutting on the light ray traveling plane and an inclination direction of a fine surface in the patterned indented structure is classified in accordance with whether the differential value is a positive value or a negative value, the main inclination direction of the patterned indented structure means a more frequent inclination direction, wherein when the entrance plane is irradiated with the light rays derived from the auxiliary light source and traveling on the light ray traveling plane, a ratio of the light rays satisfying following Formula (1) or Formula (2) is 50% or more, $$\theta_{id} < \theta_{dd-} \leq \theta_{od} \leq \theta_{dd+} \quad (1)$$

$$\theta_{dd-} \leq \theta_{id} \leq \theta_{dd+} < \theta_{od} \quad (2)$$

where the $\theta_{id}$ means an angle of the light ray derived from the auxiliary light source and directed from the entrance plane toward the reflective layer with reference to the normal line of the entrance plane immediately after being incident on the light diffusion control layer, the $\theta_{od}$ means an angle of the light ray derived from the auxiliary light source, reflected from the reflective layer, and directed toward the entrance plane with reference to the normal line of the entrance plane immediately after being incident on the light diffusion control layer, and the $\theta_{dd-}$ and $\theta_{dd+}$ are defied as angles of a lower limit and an upper limit of a diffusion angle range of the light diffusion control layer, respectively, which are converted to angles in the light diffusion control layer with consideration for refraction occurring at an interface between air and the light diffusion control layer, wherein the diffusion angle range refers to a range of an incident angle at which a haze value is 90% or more when light rays are sequentially incident on one surface of the light diffusion control layer alone within a range of the incident angle of −90° to 90° and the haze value of transmitted light is measured at another surface (Invention 2).

In the external light use type display body according to the above invention (Invention 2), the above-described light diffusion control layer and the above-described reflective layer are laminated so as to satisfy the condition of the above Formula (1) or Formula (2), and the light from the auxiliary light source can thereby be well reflected toward a viewer. As a result, the viewer can visually recognize the bright and uniform display.

In the above invention (Invention 1, 2), the patterned indented structure may be preferably a sawtooth structure in which when at least one cross section cut in the thickness direction is viewed, first inclined surfaces having a predetermined inclination and second inclined surfaces having an inclination different from that of the first inclined surfaces are alternately arranged (Invention 3).

In the above invention (Invention 1, 2), when the reflective layer is viewed in a plan view, a total area of the first inclined surfaces may be preferably larger than a total area of the second inclined surfaces, and when at least one cross section of the reflective layer cut in the thickness direction is viewed, an angle of a normal line of each first inclined surface is −40° or more and −1° or less with reference to the normal line of the entrance plane (Invention 4).

In the above invention (Invention 1 to 4), the external light use type display body may preferably satisfy the Formula (1), the $\theta_{dd-}$ may be preferably −25° or more and less than 0°, and the $\theta_{dd+}$ may be preferably 0° or more and 25° or less (Invention 5).

In the above invention (Invention 1 to 4), the external light use type display body may preferably satisfy the Formula (2), the $\theta_{dd-}$ may be preferably −38° or more and less than −13°, and the $\theta_{dd+}$ may be preferably −13° or more and 19° or less (Invention 6).

Advantageous Effect of the Invention

The external light use type display body according to the present invention exhibits excellent visibility.

EMBODIMENTS FOR CARRYING OUT THE INVENTION

Hereinafter, one or more embodiments of the present invention will be described.

Figure 1:
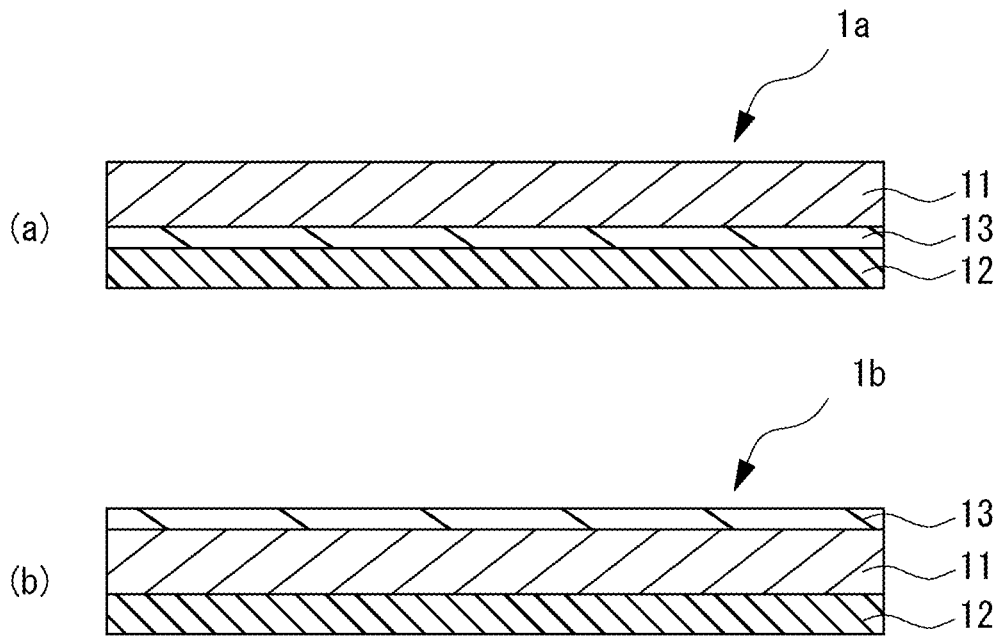
FIG. 1 is a set of cross-sectional views of external light use type display bodies according to an embodiment of the present invention.

FIG. 1 illustrates cross-sectional views of external light use type display bodies according to an embodiment of the present invention. External light use type display bodies 1a and 1b according to the present embodiment illustrated in FIG. 1 each include a light diffusion control layer 11, a display layer 13, and a reflective layer 12. In the external light use type display body 1a, 1b according to the present embodiment, the light diffusion control layer 11, the display layer 13, and the reflective layer 12 may be laminated in this order (FIG. 1(*a*)), or the display layer 13, the light diffusion control layer 11, and the reflective layer 12 may be laminated in this order (FIG. 1(*b*)). The external light use type display body 1a, 1b according to the present embodiment may further include any layer other than these three layers at any position.

Figure 2:
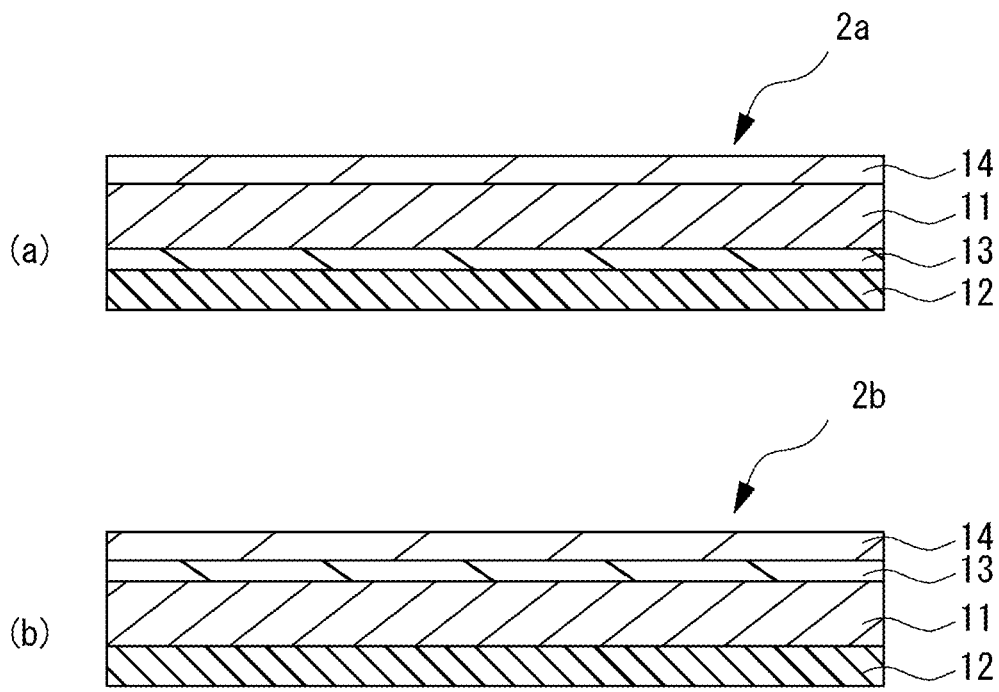
FIG. 2 is a set of cross-sectional views of external light use type display bodies according to another embodiment of the present invention.

FIG. 2 illustrates cross-sectional views of external light use type display bodies according to another embodiment of the present invention. External light use type display bodies 2a and 2b according to the present embodiment illustrated in FIG. 2 each include an auxiliary light source 14, a light diffusion control layer 11, a display layer 13, and a reflective layer 12. In the external light use type display body 2a, 2b according to the present embodiment, the auxiliary light source 14, the light diffusion control layer 11, the display layer 13, and the reflective layer 12 may be laminated in this order (FIG. 2(*a*)), or the auxiliary light source 14, the display layer 13, the light diffusion control layer 11, and the reflective layer 12 may be laminated in this order (FIG. 2(*b*)). The external light use type display body 2a, 2b according to the present embodiment may further include any layer other than these four layers at any position.

In the external light use type display body according to the present embodiment, the light diffusion control layer 11 has a regular internal structure that includes a plurality of regions having a relatively high refractive index in a region having a relatively low refractive index. The reflective layer 12 has a patterned indented structure when at least one cross section cut in the thickness direction is viewed, and the surface of the patterned indented structure constitutes a reflective surface. The auxiliary light source 14 irradiates the display layer 13 with light rays.

The external light use type display body 1a, 1b according to the present embodiment illustrated in FIG. 1 and the external light use type display body 2a, 2b according to the present embodiment illustrated in FIG. 2 are configured to satisfy the condition regarding the following Formula (1) or the following Formula (2).

$$\theta_{id} < \theta_{dd-} \leq \theta_{od} \leq \theta_{dd+} \quad (1)$$

$$\theta_{dd-} \leq \theta_{id} \leq \theta_{dd+} < \theta_{od} \quad (2)$$

To explain the above Formula (1) and Formula (2), in the present specification, the surface of the external light use type display body 1a, 1b, 2a, 2b on the side distal to the reflective layer 12 is defined as an entrance plane.

In the present specification, the plane including the normal line of the above entrance plane and a diffusion central axis of the light diffusion control layer 11 is defined as a light ray traveling plane. Here, the diffusion central axis refers to an axis about which the diffusion characteristics are approximately symmetrical, and can be estimated based on the diffusion performance which is perceived by the variable haze measurement or the like of the light diffusion control layer 11.

In the present specification, the angle formed between a light ray traveling on the above light ray traveling plane and the normal line of the above entrance plane will be described according to the following rules. That is, when the above light ray is incident from a main inclination direction side of the above patterned indented structure or exits toward the main inclination direction side with reference to the normal line of the above entrance plane, the angle will be assigned with a negative sign, while in the opposite case, the angle will be assigned with a positive sign.

Figure 3:
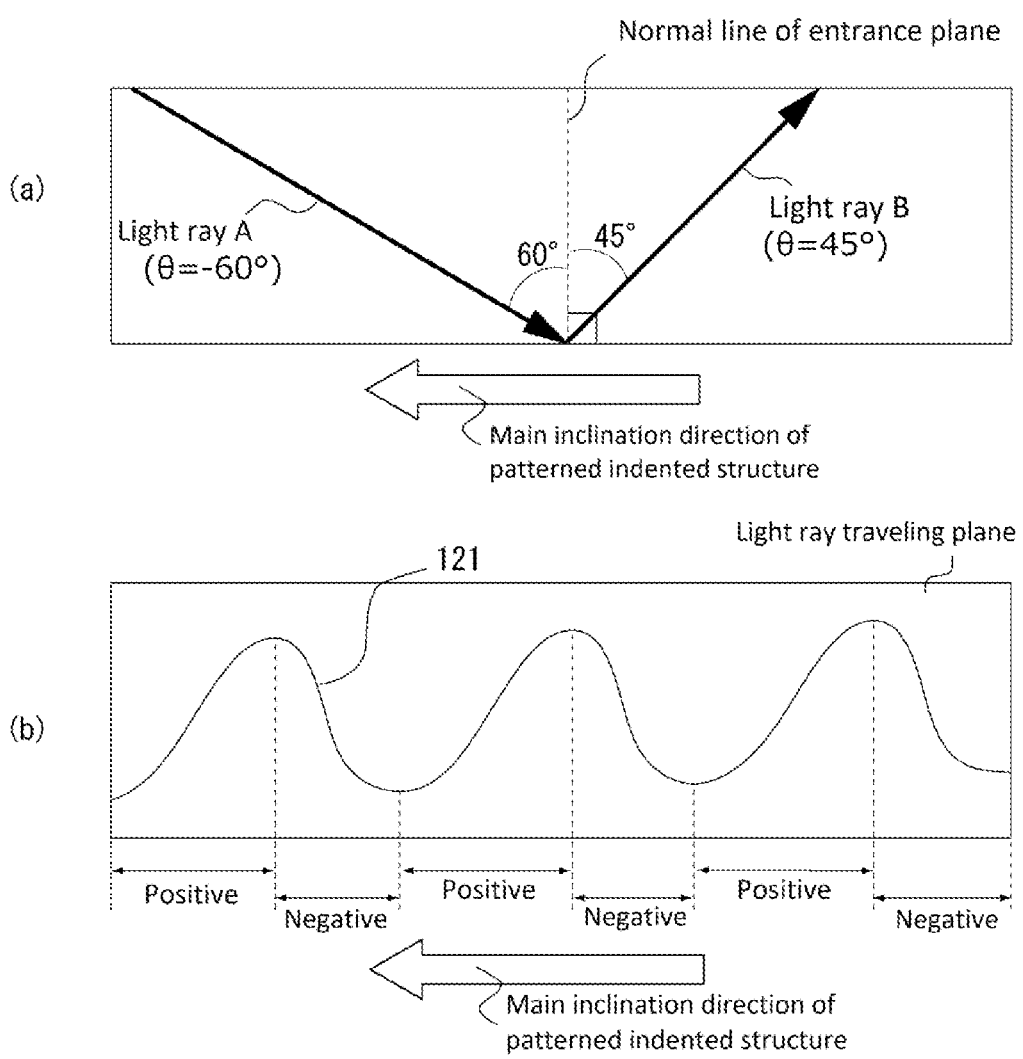
FIG. 3 is a set of diagrams schematically describing the illustration of angles of light rays.

FIG. 3(*a*) illustrates examples of these light rays (light ray A and light ray B). In particular, the light ray A is illustrated to be incident from the main inclination direction side of the patterned indented structure when the normal line of the entrance plane is used as a reference. Here, when the absolute value of an angle formed between the light ray A and the normal line of the entrance plane is 60°, the angle is assigned with a negative sign and expressed as "−60°." On the other hand, the light ray B is illustrated to exit toward the side opposite to the main inclination direction of the patterned indented structure when the normal line of the entrance plane is used as a reference. Here, when the absolute value of an angle formed between the light ray B and the normal line of the entrance plane is 45°, the angle is used as it is or assigned with a negative sign and expressed as "45°" or "+45°."

The above "main inclination direction of the patterned indented surface" is determined as follows. First, assume a cross section of the above patterned indented structure obtained by cutting on the above light ray traveling plane. FIG. 3(*b*) illustrates an example of the cross section. Subsequently, in a patterned indented structure 121 included in the cross section, the position in the thickness direction of the reflective layer 12 (up-down direction on the paper plane of FIG. 3(*b*)) is differentiated at the position in the in-plane direction of the reflective layer 12 (right-left direction on the paper plane of FIG. 3(*b*)). As illustrated in FIG. 3(*b*), the differential value thus obtained is a positive value or a negative value (or zero as the switching point between the positive value and the negative value, which is not illustrated) depending on the direction of inclination in the patterned indented structure 121. Then, when the inclination direction of a fine surface in the patterned indented structure 121 is classified in accordance with whether the differential value is a positive value or a negative value, the more frequent inclination direction is defined as the above "main inclination direction of the patterned indented surface." In the case of FIG. 3(*b*), the positive values have a higher frequency, and the inclined surface side assigned with "Positive" is therefore the "main inclination direction of the patterned indented surface."

On the assumption of the above, when the above entrance plane is irradiated with light rays that travel on the above light ray traveling plane with a predetermined incident angle while being scanned along an intersection line of the above light ray traveling plane and the above entrance plane, the ratio of the above light rays satisfying the above Formula (1) or the above Formula (2) is 50% or more in the external light use type display body 1a, 1b according to the present embodiment illustrated in FIG. 1.

Here, in the above Formula (1) and Formula (2), $\theta_{id}$ means the angle of a light ray directed from the above entrance plane toward the reflective layer 12 with reference to the normal line of the above entrance plane immediately after being incident on the light diffusion control layer 11. In particular, in the external light use type display body 1a, 1b illustrated in FIG. 1, the specific angle of $\theta_{id}$ is −35° or −25°. That is, when the above entrance plane is irradiated with light rays so that $\theta_{id}$ is −35° or −25°, there is a case in which the external light use type display body 1a, 1b illustrated in FIG. 1 satisfies the condition of any of the above-described Formula (1) and Formula (2). In particular, when the light rays are scanned along the intersection line of the above light ray traveling plane and the above entrance plane while maintaining $\theta_{id}$=−35° or −25°, the condition of any of the above-described Formula (1) and Formula (2) is satisfied in 50% or more of the light rays for irradiation. Note, however, that the ratio of 50% or more may be achieved at any one of $\theta_{id}$=−35° and −25°.

In the present specification, the angle of a light ray "immediately after being incident" means an angle before the light ray is diffused due to the action of the light diffusion control layer 11. Normally, when a light ray is incident on the light diffusion control layer 11 from the air or a layer adjacent to the light diffusion control layer 11, refraction of light occurs upon the light ray passing through the interface and diffusion of light occurs while the light ray passes through the inside of the light diffusion control layer 11, but "immediately after being incident," it can be considered that only the refraction occurs and the diffusion does not occur.

The above $\theta_{od}$ means the angle of a light ray reflected from the reflective layer 12 and directed toward the above entrance plane with reference to the normal line of the above entrance plane immediately after being incident on the light diffusion control layer 11. Simply stated, the above $\theta_{od}$ represents an angle when a light ray irradiating the above entrance plane at a predetermined angle (in the external light use type display body 1a, 1b illustrated in FIG. 1, at an angle at which $\theta_{id}$=−35° or −25° as described above) is reflected from the reflective layer 12 to return in the direction toward the above entrance plane immediately after being incident on the light diffusion control layer 11.

The above $\theta_{dd-}$ and $\theta_{dd+}$ are defied as the angles of the lower and upper limits of a diffusion angle range of the light diffusion control layer 11, respectively, which are converted to angles in the light diffusion control layer 11 with consideration for the refraction occurring at the interface between the air and the light diffusion control layer 11. Here, the above diffusion angle range refers to a range of the incident angle at which a haze value is 90% or more when light rays are sequentially incident on one surface of the light diffusion control layer 11 alone (i.e., the light diffusion control layer 11 in a state in which other layers are not laminated) within a range of the incident angle of −90° to 90° and the haze value of the transmitted light is measured at the other surface.

On the other hand, in the external light use type display body 2a, 2b according to the present embodiment illustrated in FIG. 2, when the above entrance plane is irradiated with light rays that are derived from the above auxiliary light source and travel on the above light ray traveling plane, the ratio of the above light rays satisfying the above-described Formula (1) or Formula (2) is 50% or more.

The definitions of $\theta_{id}$, $\theta_{od}$, $\theta_{dd-}$, and $\theta_{dd+}$ in the external light use type display body 2a, 2b according to the present embodiment illustrated in FIG. 2 are basically the same as those in the external light use type display body 1a, 1b illustrated in FIG. 1. In the external light use type display body 2a, 2b illustrated in FIG. 2, however, $\theta_{id}$ is not specified as −35° or −25°. Therefore, the ratio of the light rays satisfying the condition of the above-described Formula (1) or Formula (2) is 50% or more in the light rays that are emitted from the auxiliary light source 14 of the external light use type display body 2a, 2b and travel on the light ray traveling plane.

Whether or not a certain external light use type display body satisfies the above-described Formula (1) or Formula (2) with the above-described ratio can be confirmed as follows. First, on the basis of the diffusion angle range measured as described above for the light diffusion control layer alone and the refractive index of the light diffusion control layer, the angles of the lower and upper limits of the diffusion angle range are converted to angles in the light diffusion control layer (details will be described later) to obtain the angles $\theta_{dd-}$ and $\theta_{dd+}$.

Then, the surface of the external light use type display body on the light diffusion control layer side is irradiated with light rays at a predetermined incident angle, and the angles of exiting light rays are sequentially measured.

Here, in the case of an external light use type display body with no auxiliary light source, the incident angle is set such that the angle $\theta_{id}$ is −35° or −25° with consideration for the refraction occurring in the optical path when the display body is constituted. The incident point is changed along the intersection line of the light ray traveling plane and the entrance plane (the surface on the side distal to the reflective layer in the external light use type display body), which are expected when the external light use type display body is constituted, after determining the light ray traveling plane and the entrance plane.

On the other hand, in the case of an external light use type display body with an auxiliary light source, it is irradiated with light rays by turning on the auxiliary light source.

Then, the sequentially measured angles are converted to angles in the light diffusion control layer to obtain the angle $\theta_{id}$ and the angle $\theta_{od}$ with consideration for the refraction occurring in the optical path when the display body is constituted. For the angle $\theta_{id}$ and angle $\theta_{od}$ thus obtained for each of the light rays, the ratio satisfying the above-described relationship of Formula (1) or Formula (2) is calculated, and a determination can thereby be made as to whether the above-described ratio is satisfied.

1. Details of Formula (1) and Formula (2)

Figure 4:
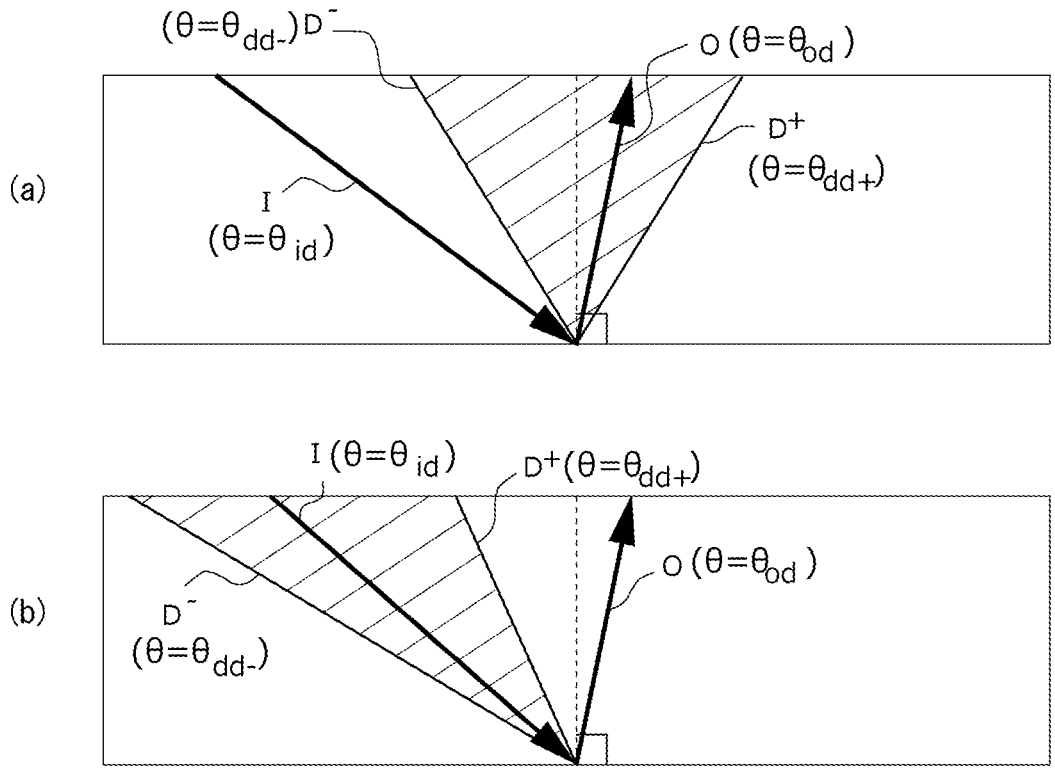
FIG. 4 is a set of diagrams for schematically describing the conditions in an embodiment of the present invention.

The above Formula (1) and Formula (2) will be described in more detail below with reference to FIG. 4.

FIG. 4(a) illustrates the relationship between the light rays in the light diffusion control layer 11 and the diffusion angle range (converted range) when the condition of the above Formula (1) is satisfied, and FIG. 4(b) illustrates the relationship between the light rays in the light diffusion control layer 11 and the diffusion angle range (converted range) when the condition of the above Formula (2) is satisfied. These figures are cross-sectional views schematically illustrating only the light diffusion control layer 11 extracted, and fundamentally, the reflective layer 12 is directly laminated on or indirectly laminated via another layer on the light diffusion control layer 11 in the downward direction of the paper plane.

In FIGS. 4(a) and 4(b), the arrow indicated by "I" represents a light ray that is incident from the entrance plane side and passes through the light diffusion control layer 11, and the angle formed between the light ray I and the normal line of the entrance plane is $\theta_{id}$. The arrow indicated by "O" represents a light ray in which the light ray I is reflected from the reflective layer 12 fundamentally existing in the downward direction of the paper plane and returns to and passes through the light diffusion control layer 11, and the angle formed between the light ray O and the normal line of the entrance plane is $\theta_{od}$ The range surrounded by the lines denoted by "D⁻" and "D⁺" (range marked with diagonal lines in the figure) corresponds to the diffusion angle range of the light diffusion control layer 11. The angle formed between the line D⁻ and the normal line of the entrance plane is $\theta_{dd-}$, and the angle formed between the line D⁺ and the normal line of the entrance plane is $\theta_{dd+}$.

In the above Formula (1), the angle $\theta_{id}$ is outside the range between the angle $\theta_{dd-}$ and the angle $\theta_{dd+}$, and the angle $\theta_{od}$ is within the range. That is, as illustrated in FIG. 4(a), this means that the light ray I which is derived from an external light source or the auxiliary light source 14 and incident on the light diffusion control layer 11 passes through the light diffusion control layer 11 outside the range surrounded by the line D⁻ and the line D⁺ and then the light ray O reflected from the reflective layer 12 passes through the range surrounded by the line D⁻ and the line D⁺ and exits from the light diffusion control layer 11. Here, the range surrounded by the line D⁻ and the line D⁺ corresponds to the diffusion angle range, and therefore the haze value of the light ray passing through the range is 90% or more when the light ray exits the range, that is, the light ray strongly diffuses and transmits. Thus, the light ray I passes through the light diffusion control layer 11 without light diffusion or with weak light diffusion, and then the light ray O strongly diffuses and transmits to exit from the light diffusion control layer 11.

On the other hand, in the above Formula (2), the angle $\theta_{id}$ is within the range between the angle $\theta_{dd-}$ and the angle $\theta_{dd+}$, and the angle $\theta_{od}$ is outside the range. That is, as illustrated in FIG. 4(b), this means that the light ray I which is derived from an external light source or the auxiliary light source 14 and incident on the light diffusion control layer 11 passes through the light diffusion control layer 11 within the range surrounded by the line D⁻ and the line D⁺ and then the light ray O reflected from the reflective layer 12 passes outside the range surrounded by the line D⁻ and the line D⁺ and exits from the light diffusion control layer 11. In this case, the light ray I strongly diffuses and transmits through the light diffusion control layer 11, and then the light ray O exits from the light diffusion control layer 11 while maintaining the diffused state without being strongly diffused again.

The external light use type display body 1a, 1b and the external light use type display body 2a, 2b according to the present embodiment satisfy the condition of the above Formula (1) or (2) at the previously described predetermined ratio and can thereby allow the light rays incident from an oblique direction to be effectively diffused and reflected for a viewer existing in the front direction. As a result, the viewer can visually recognize the display content, which is provided by the display layer 13, with sufficient and uniform brightness. This can prevent the light rays from being excessively diffused without double diffusion before and after the reflection by the reflective layer 12 to reduce the brightness or impair the uniformity of the diffused light.

As described previously, the diffusion angle range of the light diffusion control layer 11 is obtained from the incident angle, which satisfies a predetermined haze value, of light rays in the light rays irradiating the light diffusion control layer 11 alone from the air. That is, the diffusion angle range is defined based on the angle of light rays in the air. On the other hand, the above Formula (1) and Formula (2) in the present embodiment target the angles $\theta_{dd-}$ and $\theta_{dd+}$ in the light diffusion control layer 11. Therefore, the angles of the lower and upper limits of the diffusion angle range are converted to angles in the light diffusion control layer 11 and used as the angles $\theta_{dd-}$ and $\theta_{dd+}$ with consideration for the refraction occurring at the interface between the air and the light diffusion control layer 11. Specifically, the conversion is performed based on the following equations.

$$\theta_{dd-} = \arcsin\{\sin(\theta_{d-}) \times 1/n\}$$

$$\theta_{dd+} = \arcsin\{\sin(\theta_{d+}) \times 1/n\}$$

In these equations, $\theta_{d-}$ and $\theta_{d+}$ mean the angles of the lower and upper limits of the diffusion angle range of the light diffusion control layer 11, respectively, and n means the refractive index of the light diffusion control layer 11.

When the external light use type display body 1a, 1b, 2a, 2b according to the present embodiment is irradiated with light rays as described previously, the above ratio of the light rays satisfying the above Formula (1) or the above Formula (2) is 50% or more, but from the viewpoint of achieving further excellent visibility, the above ratio may be preferably 70% or more and particularly preferably 90% or more. The upper limit of the above ratio is not particularly limited and may be 100%.

When the external light use type display body 1a, 1b, 2a, 2b according to the present embodiment satisfies the above Formula (1), the angle $\theta_{dd-}$ may be preferably −25° or more, particularly preferably −22° or more, and further preferably −19° or more. From another aspect, the angle $\theta_{dd-}$ may be preferably less than 0°, particularly preferably −3° or less, and further preferably −6° or less. Additionally or alternatively, the angle $\theta_{dd+}$ may be preferably 0° or more, particularly preferably 3° or more, and further preferably 6° or more. From another aspect, the angle $\theta_{dd+}$ may be preferably 25° or less, particularly preferably 22° or less, and further preferably 19° or less. By satisfying such angles, the external light use type display body 1a, 1b, 2a, 2b according to the present embodiment can achieve more excellent visibility.

On the other hand, when the external light use type display body 1a, 1b, 2a, 2b according to the present embodiment satisfies the above Formula (2), the angle $\theta_{dd-}$ may be preferably −38° or more, particularly preferably −37° or more, and further preferably −35° or more. From another aspect, the angle $\theta_{dd-}$ may be preferably less than −13°, particularly preferably −16° or less, and further preferably −19° or less. Additionally or alternatively, the angle $\theta_{dd+}$ may be preferably −13° or more, particularly preferably −10° or more, and further preferably −6° or more. From another aspect, the angle $\theta_{dd+}$ may be preferably 19° or less, particularly preferably 16° or less, and further preferably 13° or less. By satisfying such angles, the external light use type display body 1a, 1b, 2a, 2b according to the present embodiment can achieve more excellent visibility.

2. Light Diffusion Control Layer

The light diffusion control layer 11 in the present embodiment has a regular internal structure that comprises a plurality of regions having a relatively high refractive index in a region having a relatively low refractive index, and the internal structure, composition, or the like of the light diffusion control layer 11 is not limited, provided that the previously described diffusion angle range is exhibited according to the internal structure.

The above-described regular internal structure refers to an internal structure configured such that the plurality of regions having a relatively high refractive index is arranged with a predetermined regularity in the region having a relatively low refractive index. For example, the regular internal structure refers to an internal structure configured such that, when viewing a cross section obtained by cutting the light diffusion control layer 11 along a plane parallel to the surface of the light diffusion control layer 11, the regions having a relatively high refractive index are repeatedly arranged at a similar pitch along at least one direction in the above cross section in the region having a relatively low index. Thus, the regular internal structure as referred to herein has a feature that the regions having a relatively high refractive index extend in the thickness direction of the light diffusion control layer 11, and this feature is distinguished from those of a phase-separation structure in which one phases exist in the other phase without clear regularity and a sea-island structure in which approximately spherical island components exist in a sea component.

According to the above regular internal structure, the light incident on the surface of the light diffusion control layer 11 within a predetermined incident angle range can exit the light diffusion control layer 11 while being strongly diffused with a predetermined opening angle. On the other hand, when the incident light is outside the above incident angle range, the incident light transmits through the light diffusion control layer 11 without being diffused or exits the light diffusion control layer 11 with weaker diffusion than that in the case of the incident light within the incident angle range.

From the viewpoint of readily forming the regular internal structure as described above, the light diffusion control layer 11 according to the present embodiment may be preferably a layer obtained by curing a composition for light diffusion control layer that contains a high refractive index component and a low refractive index component having a refractive index lower than that of the high refractive index component. As the high refractive index component and the low refractive index component and other components contained in the composition for light diffusion control layer, conventionally known ones can be used. The light diffusion control layer 11 can be formed by using a conventionally known method.

The thickness of the light diffusion control layer 11 in the present embodiment may be preferably 30 µm or more, particularly preferably 45 µm or more, and further preferably 60 µm or more. From another aspect, the above thickness may be preferably 1000 µm or less, particularly preferably 500 µm or less, and further preferably 200 µm or less. When the thickness of the light diffusion control layer 11 is within such a range, the external light use type display body 1a, 1b, 2a, 2b according to the present embodiment can readily satisfy the condition of the above-described Formula (1) or Formula (2).

3. Reflective Layer

The reflective layer 12 in the present embodiment has a patterned indented structure when at least one cross section cut in the thickness direction is viewed, and the surface of the patterned indented structure constitutes a reflective surface. The reflective layer 12 is not particularly limited, provided that the external light use type display body 1a, 1b, 2a, 2b satisfies the above Formula (1) or Formula (2) at a predetermined ratio due to the patterned indented structure. The reflective layer 12 in the present embodiment includes the above patterned indented structure and can thereby reflect light rays incident from an oblique direction in the front direction. As a result, the external light use type display body 1a, 1b, 2a, 2b according to the present embodiment can readily satisfy the condition of the above-described Formula (1) or Formula (2).

Figure 5:
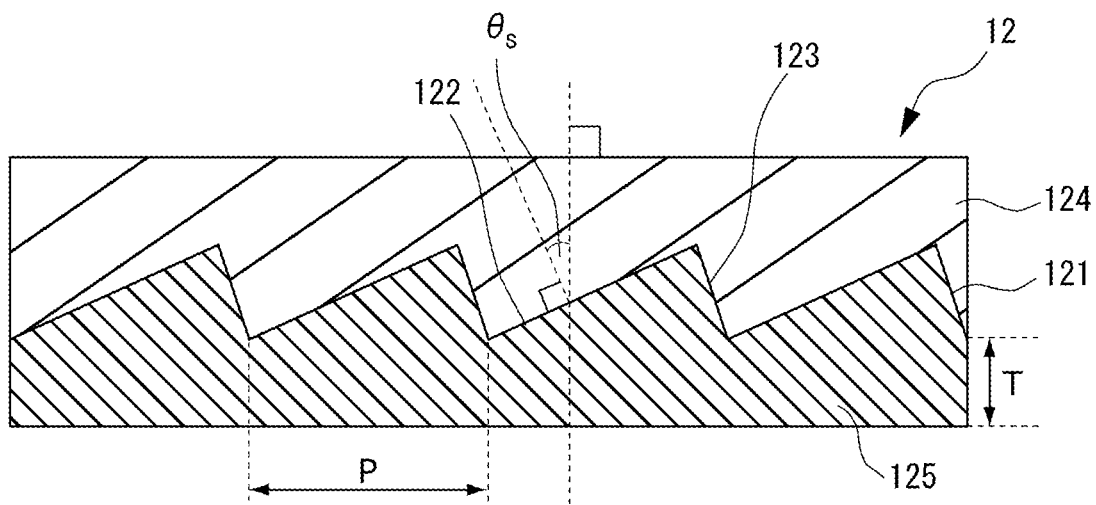
FIG. 5 is a cross-sectional view of an example of a reflective layer in an embodiment of the present invention.

Examples of the above-described patterned indented structure include a sawtooth structure as illustrated in FIG. 5. FIG. 5 is a cross-sectional view illustrating at least one cross section of the reflective layer 12 having a sawtooth structure cut in the thickness direction. The reflective layer 12 includes a sawtooth structure 121, a support region 125 that supports the sawtooth structure 121, and a transparent region 124 laminated on the sawtooth structure 121. The sawtooth structure 121 has a structure in which first inclined surfaces 122 having a predetermined inclination and second inclined surfaces 123 having an inclination different from that of the first inclined surfaces 122 are alternately arranged.

In the reflective layer 12 having such a sawtooth structure 121, the sawtooth structure 121 has reflectivity to light rays, and the light rays incident obliquely from the surface side of the transparent region 124 can be effectively reflected in the front direction. The reflective layer 12 having the sawtooth structure 121 may not be provided with the transparent region 124.

In the reflective layer 12 having the sawtooth structure 121, it is preferred that the first inclined surfaces 122 and the second inclined surfaces 123 have different sizes as illustrated in FIG. 5. That is, when the reflective layer 12 is viewed in a plan view, for example, the total area of the first inclined surfaces 122 may be preferably larger than the total area of the second inclined surfaces 123. In this case, the external light use type display body 1a, 1b, 2a, 2b according to the present embodiment may be installed so that the first inclined surfaces 122 face a main light source (such as the sun, an indoor light installed on the ceiling, or an auxiliary light source), and it is thereby possible to more effectively reflect the light rays from the light source to the viewer.

Provided that the total area of the first inclined surfaces 122 is larger than the total area of the second inclined surfaces 123 as described above, when at least one cross section of the reflective layer 12 cut in the thickness direction (in particular, a cross section cut parallel to the direction in which the first inclined surfaces 122 and the second inclined surfaces 123 are arranged) is viewed, the angle of the normal line of each first inclined surface 122 (in FIG. 5, the angle denoted by "$\theta_s$") may be preferably −40° or more, particularly preferably −35° or more, and further preferably −30° or more with reference to the normal line of one surface of the reflective layer 12 (normal line of the entrance plane). From another aspect, the above angle may be preferably −1° or less, particularly preferably −3° or less, and further preferably −5° or less. When the angle of the first inclined surfaces 122 is within the above range, light rays can be more effectively reflected to the viewer.

The method of producing the reflective layer 12 having the sawtooth structure 121 is not particularly limited. For example, the reflective layer 12 can be produced through forming the support region 125 and then sequentially laminating the sawtooth structure 121 and the transparent region 124 on the support region 125. When forming the support region 125, it is preferred to form the surface of the support region 125 to be laminated with the sawtooth structure 121 into a shape corresponding to the sawtooth structure 121. The material of the support region 125 is not particularly limited, and a resin, a metal, or the like can be used. A resin may be preferred from the viewpoint of easily forming a shape corresponding to the sawtooth structure 121, while when the support region 125 also serves as an electrode of a display element, a metal may be preferred. The material of the sawtooth structure 121 is not particularly limited, provided that it can form a mirror surface having a high reflectance, and it may be preferred to use a metal such as aluminum, silver, or nickel. In particular, as described above, it may be preferred to form the sawtooth structure 121 by vapor-depositing a metal on the surface of the support region 125 which has been formed with the shape corresponding to the sawtooth structure 121. The material of the transparent region 124 is not particularly limited, provided that it has a high transmittance for light rays. For example, a resin, glass, or the like can be used.

The sawtooth structure 121 has been described in detail as an example of the patterned indented structure in the present embodiment, but the patterned indented structure is not limited to the sawtooth structure 121 and may be any other structure, for example, a randomly formed structure. The patterned indented structure is also not limited to a structure composed only of flat surfaces and may be composed only of curved surfaces or a combination of flat surfaces and curved surfaces.

The thickness of the reflective layer 12 in the present embodiment is not particularly limited, but may be, for example, 0.1 μm or more in an embodiment or 1 μm or more in another embodiment. From another aspect, the above thickness may be 1000 μm or less in an embodiment or 500 μm or less in another embodiment.

4. Display Layer

The display layer 13 in the present embodiment is not particularly limited, provided that it can display the display content and has transmittance for light rays. For example, the display layer 13 may be a print layer in which the display content is printed on a layer adjacent to the display layer 13, may be a transparent or translucent film on which characters and/or images are printed, or may be a display device that electronically displays the content. Examples of the display device include a liquid crystal display, electronic paper, an electrophoresis display, a MEMS display, a solid crystal display, and other similar displays.

5. Auxiliary Light Source

The auxiliary light source 14 in the present embodiment is not particularly limited, provided that it can irradiate the display layer 13 with light rays and does not significantly hinder the visibility of the display content. Preferred examples of the auxiliary light source 14 include a front light comprising a light source and a light guide member.

The light guide member in the front light may be preferably provided so as to cover a layer (such as the light diffusion control layer 11 or the display layer 13) located just below the auxiliary light source 14. The above light source may also be preferably provided at least at a part of the peripheral edge portion of the auxiliary light source 14 so as to be in contact with the above light guide member.

The above light guide member serves to guide the light rays emitted from the light source to the display layer 13. The structure of the light guide member is not limited, provided that it exerts such an action, and may be, for example, a material provided with irregularities that constitute prisms inside, or a material coated with a reflective material containing particles that reflect light.

The position of the above light source is not limited, provided that the display layer 13 can be irradiated with light via the light guide member. For example, the light source may be provided at a position on the upper side (upper side for the viewer) of the peripheral edge portion of the display surface.

The auxiliary light source 14 may preferably irradiate the light diffusion control layer 11 with light rays under the following condition. That is, in the light rays emitted from the auxiliary light source 14, 60% of the entire light rays immediately after being incident on the light diffusion control layer 11 may be preferably within a range of the incident angle of −45° or more and particularly preferably within a range of −41° or more. From another aspect, in the light rays emitted from the auxiliary light source 14, 60% of the entire light rays immediately after being incident on the light diffusion control layer 11 may be preferably within a range of −20° or less, more preferably within a range of −25° or less, particularly preferably within a range of −30° or less, and further preferably within a range of −35° or less.

6. Other Components

The external light use type display body 1*a*, 1*b*, 2*a*, 2*b* according to the present embodiment may include one or more components other than the above-described light diffusion control layer 11, reflective layer 12, display layer 13, and auxiliary light source 14.

For example, the external light use type display body 1*a*, 1*b*, 2*a*, 2*b* may include a surface coat layer, a cover panel, or the like on the outermost surface on the viewer side. Additionally or alternatively, a backlight or the like may be provided on the outermost surface on the opposite side to the viewer.

Additionally or alternatively, the external light use type display body 1*a*, 1*b*, 2*a*, 2*b* according to the present embodiment may include a deflection element that deflects the optical path of light rays. Also when such a deflection element is provided, the external light use type display body 1*a*, 1*b*, 2*a*, 2*b* according to the present embodiment can achieve excellent visibility by satisfying the condition of the previously described Formula (1) or (2).

The shape of the display surface of the external light use type display body 1*a*, 1*b*, 2*a*, 2*b* according to the present embodiment is not particularly limited, but typically, the display surface may preferably have a rectangular shape. In this case, the display surface may be a rectangle composed of a pair of long sides and a pair of short sides or may also be a square whose all sides have the same length. Additionally or alternatively, the shape of the display surface may be a quadrangular shape other than a rectangular shape, such as a diamond shape, a trapezoidal shape, or a parallelogram, a circular shape such as a perfect circle or an ellipse, or an irregular shape other than these.

7. Method of Manufacturing External Light Use Type Display Body

The method of manufacturing the external light use type display body 1*a*, 1*b*, 2*a*, 2*b* according to the present embodiment is not particularly limited, and it can be manufactured by using a conventional manufacturing method.

For example, the external light use type display body 1*a*, 1*b*, 2*a*, 2*b* can be obtained through manufacturing the light diffusion control layer 11, the reflective layer 12, and the display layer 13 and, if necessary, the auxiliary light source 14 and laminating them in a predetermined lamination order.

EXAMPLES

Hereinafter, the present invention will be described further specifically with reference to examples, etc., but the scope of the present invention is not limited to these examples, etc.

<Preparation of Reflective Layer>

A reflective layer having a sawtooth structure was prepared, in which first inclined surfaces and second inclined surfaces were alternately arranged. As illustrated in FIG. 5, the reflective layer includes the above sawtooth structure 121, the support region 125 that supports the sawtooth structure 121, and the transparent region 124 laminated on the sawtooth structure 121. When the reflective layer 12 is viewed in a plan view, the total area of the first inclined surfaces 122 is larger than the total area of the second inclined surfaces 123.

Regarding the dimensions of the above reflective layer, the angle of the normal line of each first inclined surface 122 (angle denoted by "$\theta_s$" in FIG. 5) is −17°, and the angle of the normal line of each second inclined surface 123 is 70°. The spacing (pitch) of teeth that constitute the sawtooth structure (length denoted by "P" in FIG. 5) is 100 μm, and the thickness of the support region 125 (length denoted by "T" in FIG. 5) is 150 μm.

Regarding the material of the above reflective layer, the transparent region 124 is made of a transparent resin material having a refractive index of 1.4. The sawtooth structure 121 is formed by vapor-depositing aluminum on the surface of the support region 125, and the entire surface is a mirror surface.

<Preparation of Light Diffusion Control Layer>

Films A to C were prepared as the light diffusion control layer. Each of these films has a regular internal structure comprising a plurality of regions having a relatively high refractive index in a region having a relatively low refractive index and thereby exhibits predetermined light diffusion characteristics. These films were produced by using the method as disclosed in JP2021-032961A, etc.

Figure 6:
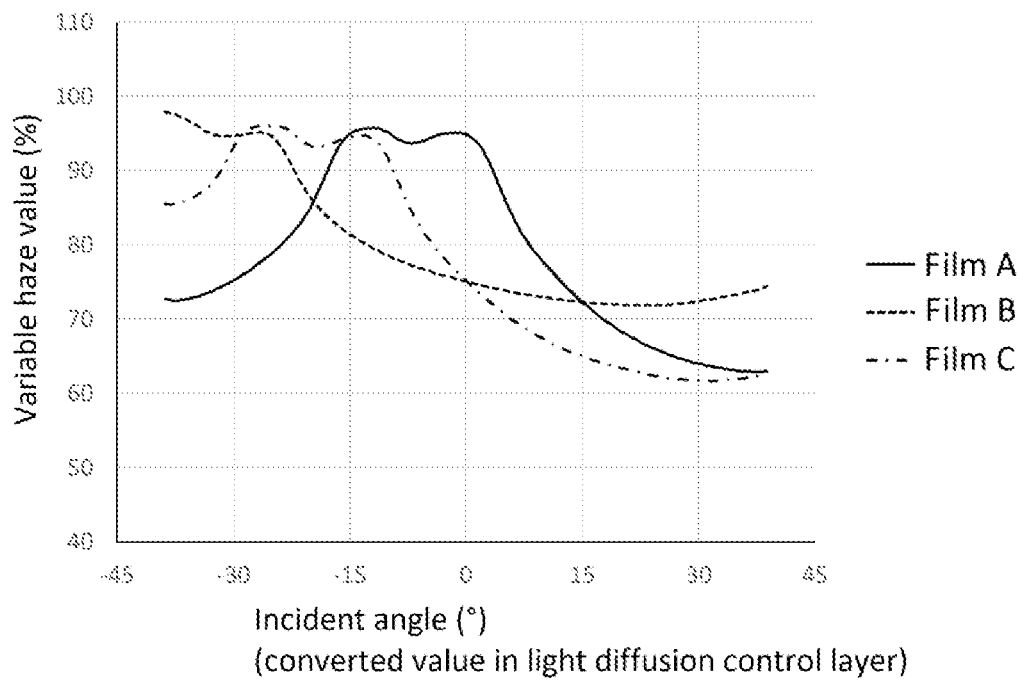
FIG. 6 is a diagram illustrating a variable haze value of a light diffusion control layer used in Examples.

Films A to C exhibit respective variable haze values (%) illustrated in FIG. 6. Films A to C exhibit the angles $\theta_{dd-}$ and $\theta_{dd+}$ listed in Table 1 below.

TABLE 1

|  | $\theta_{dd-}$ (deg.) | $\theta_{dd+}$ (deg.) |
| --- | --- | --- |
| Film A | −17.9 | 3.5 |
| Film B | −38.8 or less | −22.1 |
| Film C | −31.6 | −9.3 |

Example 1

Film A prepared as described above was laminated on the surface of the reflective layer prepared as described above on the transparent region side, and Sample A of an external light use type display body was thus obtained. The lamination was performed so that the light ray traveling plane of the light diffusion control layer (plane including the normal line of one surface of the light diffusion control layer and the diffusion central axis of the light diffusion control layer) would be parallel to the arrangement direction of the teeth of the sawtooth structure in the reflective layer. Although Sample A does not include a display layer, the optical characteristics such as the optical path of incident light rays are almost the same as those when the display layer is provided.

For Sample A of the external light use type display body, when $\theta_{id}$ is −25°, $\theta_{od}$ is calculated to be about −6°. In Sample A of the external light use type display body, therefore, the relational expression of $$\theta_{id}(-25°) < \theta_{dd-}(-17.9°) \leq \theta_{od}(-6°) \leq \theta_{dd+}(3.5°)$$

is satisfied, that is, the previously described Formula (1) is satisfied.

This relational expression is satisfied in all the cases in which the irradiation position of the light ray is scanned along the intersection line of the entrance plane and the light ray traveling plane (plane including the normal line of the entrance plane and the diffusion central axis of the light diffusion control layer), and therefore the ratio of light rays satisfying Formula (1) is 100%.

Example 2

Sample B of an external light use type display body was obtained in the same manner as in Example 1 except that Film B was used as substitute for Film A. For Sample B of the external light use type display body, when $\theta_{id}$ is −25°, $\theta_{od}$ is calculated to be −9.5°. In Sample B of the external light use type display body, therefore, the relational expression of $$\theta_{dd-}(-38.8° \text{ or less}) \leq \theta_{id}(-25°) \leq \theta_{dd+}(-22.1°) < \theta_{od}(-9.5°)$$

is satisfied, that is, the previously described Formula (2) is satisfied.

This relational expression is satisfied in all the cases in which the irradiation position of the light ray is scanned along the intersection line of the entrance plane and the light ray traveling plane (plane including the normal line of the entrance plane and the diffusion central axis of the light diffusion control layer), and therefore the ratio of light rays satisfying Formula (2) is 100%.

Comparative Example 1

Sample C of an external light use type display body was obtained in the same manner as in Example 1 except that Film C was used as substitute for Film A. For Sample C of the external light use type display body, when $\theta_{id}$ is −25°, $\theta_{od}$ is calculated to be −20.7°. As listed in the above Table 1, in Film C, $\theta_{dd-}=-31.6°$ or less, $\theta_{dd+}=-9.3°$, and both $\theta_{id}$ and $\theta_{od}$ are included in the resulting range; therefore, neither the previously described Formula (1) nor Formula (2) is satisfied, and the ratio of light rays satisfying Formula (1) or Formula (2) is not 50% or more.

<Testing Example> (Measurement of Diffused Light Reflectance)

For the samples of external light use type display bodies obtained in Examples and Comparative Example, the diffused light reflectance was measured by using a diffused luminance distribution measuring device (available from Suga Test Instruments Co., Ltd., product name "Variable-angle color meter VC-2").

Specifically, the surface of each external light use type display body sample on the light diffusion control layer side was irradiated with light rays at an incident angle of $\theta_{id}=-25°$, and the light intensity of the diffused light generated by reflection from the external light use type display body sample was sequentially measured while changing the angle of a light receiver. The angle of the light receiver was set so that the angle (light receiver angle) formed between the line segment connecting between the emission point (point at which the reflected light was generated due to irradiation with light rays) and the light receiver and the normal line passing through the emission point on the sample surface would be −20° to 45°. The value of the angle is indicated as a negative value when the light receiver is inclined toward the first inclined surface side of the reflective layer (positional relationship facing the first inclined surface), while when the light receiver is inclined toward the second inclined surface side (positional relationship facing the second inclined surface), the value of the angle is indicated as a positive value. A C-light source was used as the light source.

Figure 7:
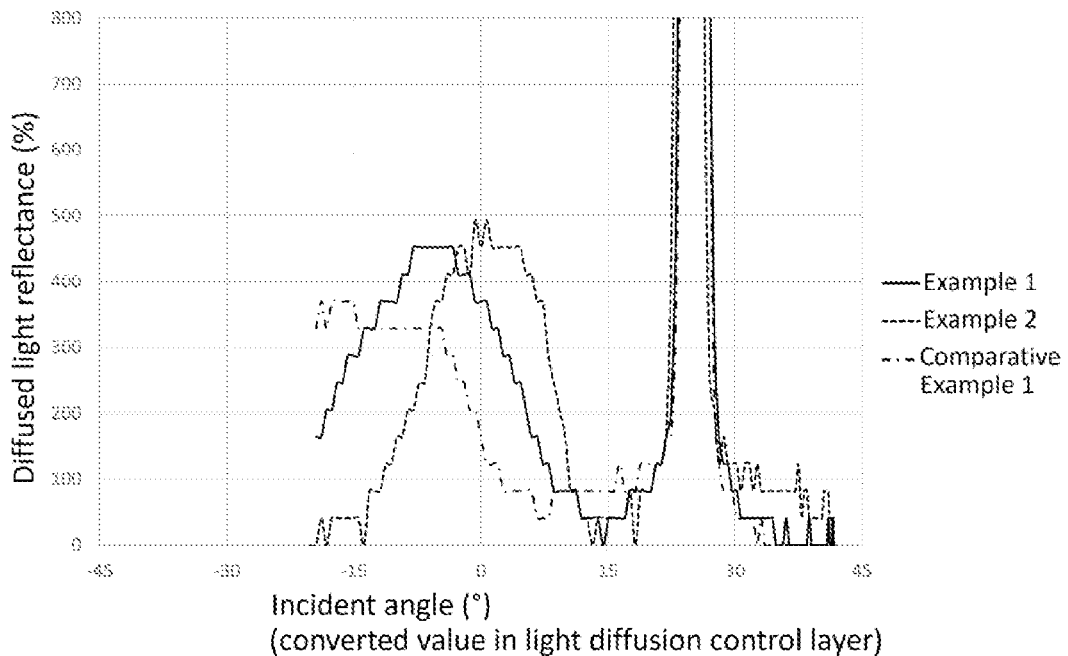
FIG. 7 is a diagram illustrating the measurement results of diffused light reflectance of the external light use type display body samples produced in Examples.

On the other hand, as a reference, a standard white calibration plate was installed as a measurement target, and the reference value of light intensity was measured in a state in which the above light receiver angle was fixed to −45°. Then, the ratio of the light intensity for each external light use type display sample measured as described above to the reference value (percentage with respect to the above reference value being 100%) was calculated. The results are illustrated in FIG. 7. In FIG. 7, the horizontal axis represents the light receiver angle (converted to the angle in the light diffusion control layer), and the vertical axis represents the light intensity (%).

As apparent from FIG. 7, the external light use type display samples according to Example 1 and Example 2 achieve higher diffused light reflectance in a wider angle range as compared with the external light use type display sample according to Comparative Example 1. That is, the external light use type display body samples according to Example 1 and Example 2 exhibit excellent visibility.

INDUSTRIAL APPLICABILITY

The external light use type display body of the present invention can be used as a display body using external light, and can be particularly suitably used as a smart watch, a tablet, electronic paper, a signboard, an advertisement, a road sign, or the like.

DESCRIPTION OF REFERENCE NUMERALS 1a, 1b, 2a, 2b External light use type display body
11 Light diffusion control layer
12 Reflective layer
  121 Sawtooth structure
  122 First inclined surface
  123 Second inclined surface
  124 Transparent region
  125 Support region
13 Display layer
14 Auxiliary light source

What is claimed is:

1. An external light use type display body comprising:
a light diffusion control layer;
a display layer; and
a reflective layer, wherein
the light diffusion control layer, the display layer, and the reflective layer is laminated in this order or the display layer, the light diffusion control layer, and the reflective layer is laminated in this order,
the light diffusion control layer has a regular internal structure that comprises a plurality of regions having a higher refractive index within a region having a comparatively lower refractive index,
the reflective layer comprises a patterned indented structure when at least one cross section cut in a thickness direction is viewed, the patterned indented structure having a surface that constitutes a reflective surface,
provided that a surface of the external light use type display body on a side distal to the reflective layer is defined as an entrance plane and a plane including a normal line of the entrance plane and a diffusion central axis of the light diffusion control layer is defined as a light ray traveling plane, an angle formed between a light ray traveling on the light ray traveling plane and the normal line of the entrance plane is assigned with a negative sign when the light ray is incident from a main inclination direction side of the patterned indented structure or exits toward the main inclination direction side with reference to the normal line of the entrance plane, while in an opposite case, the angle is assigned with a positive sign,
provided that when a position on the patterned indented structure in the thickness direction of the reflective layer is differentiated, to obtain a differential value, at a position in an in-plane direction of the reflective layer with respect to a cross section of the patterned indented structure obtained by cutting on the light ray traveling plane and an inclination direction of a fine surface in the patterned indented structure is classified in accordance with whether the differential value is a positive value or a negative value, the main inclination direction of the patterned indented structure means a more frequent inclination direction, and
the light diffusion control layer, the display layer, and the reflective layer are configured such that when the entrance plane is irradiated with light rays that travel on the light ray traveling plane with a predetermined incident angle while being scanned along an intersection line of the light ray traveling plane and the entrance plane, 50% or more of the light rays must satisfy at least one of Formula (1) or Formula (2):

$$\theta_{id} < \theta_{dd-} \leq \theta_{od} \leq \theta_{dd+} \quad (1)$$

$$\theta_{dd-} \leq \theta_{id} \leq \theta_{dd+} < \theta_{od} \quad (2)$$

where the $\theta_{id}$ means an angle of the light ray directed from the entrance plane toward the reflective layer with reference to the normal line of the entrance plane immediately after being incident on the light diffusion control layer and is −35° or −25°,
the $\theta_{od}$ means an angle of the light ray reflected from the reflective layer and directed toward the entrance plane with reference to the normal line of the entrance plane immediately after being incident on the light diffusion control layer, and
the $\theta_{dd-}$ and $\theta_{dd+}$ are defined as angles of a lower limit and an upper limit of a diffusion angle range of the light diffusion control layer, respectively,
where the $\theta_{dd-}$ is −38° or more and less than 0°, and the $\theta_{dd-}$ is equal to or between −13° and 25°.

2. An external light use type display body comprising:
an auxiliary light source;
a light diffusion control layer;
a display layer; and
a reflective layer, wherein
the auxiliary light source, the light diffusion control layer, the display layer, and the reflective layer is laminated in this order or the auxiliary light source, the display layer, the light diffusion control layer, and the reflective layer is laminated in this order,
the auxiliary light source irradiating the display layer with light rays,
the light diffusion control layer has a regular internal structure that comprises a plurality of regions having a higher refractive index within a region having a comparatively lower refractive index,
the reflective layer comprises a patterned indented structure when at least one cross section cut in a thickness direction is viewed, the patterned indented structure having a surface that constitutes a reflective surface, provided that a surface of the external light use type display body on a side distal to the reflective layer is defined as an entrance plane and a plane including a normal line of the entrance plane and a diffusion central axis of the light diffusion control layer is defined as a light ray traveling plane, an angle formed between a light ray traveling on the light ray traveling plane and the normal line of the entrance plane is assigned with a negative sign when the light ray is incident from a main inclination direction side of the patterned indented structure or exits toward the main inclination direction side with reference to the normal line of the entrance plane, while in an opposite case, the angle is assigned with a positive sign, provided that when a position on the patterned indented structure in the thickness direction of the reflective layer is differentiated, to obtain a differential value, at a position in an in-plane direction of the reflective layer with respect to a cross section of the patterned indented structure obtained by cutting on the light ray traveling plane and an inclination direction of a fine surface in the patterned indented structure is classified in accordance with whether the differential value is a positive value or a negative value, the main inclination direction of the patterned indented structure means a more frequent inclination direction, and the light diffusion control layer, the display layer, and the reflective layer are configured such that when the entrance plane is irradiated with the light rays derived from the auxiliary light source and traveling on the light ray traveling plane, 50% or more of the light rays must satisfy at least one of Formula (1) or Formula (2):

$$\theta_{id} < \theta_{dd-} \leq \theta_{od} \leq \theta_{dd+} \quad (1)$$

$$\theta_{dd-} \leq \theta_{id} \leq \theta_{dd+} < \theta_{od} \quad (2)$$

where the $\theta_{id}$ means an angle of the light ray derived from the auxiliary light source and directed from the entrance plane toward the reflective layer with reference to the normal line of the entrance plane immediately after being incident on the light diffusion control layer, the $\theta_{od}$ means an angle of the light ray derived from the auxiliary light source, reflected from the reflective layer, and directed toward the entrance plane with reference to the normal line of the entrance plane immediately after being incident on the light diffusion control layer, and the $\theta_{dd-}$ and $\theta_{dd+}$ are defined as angles of a lower limit and an upper limit of a diffusion angle range of the light diffusion control layer, respectively, where the $\theta_{dd-}$ is −38° or more and less than 0°, and the $\theta_{dd-}$ is equal to or between −13° and 25°.

3. The external light use type display body according to claim 1, wherein the patterned indented structure is a sawtooth structure in which when at least one cross section cut in the thickness direction is viewed, first inclined surfaces having a predetermined inclination and second inclined surfaces having an inclination different from that of the first inclined surfaces are alternately arranged.

4. The external light use type display body according to claim 3, wherein
when the reflective layer is viewed in a plan view, a total area of the first inclined surfaces is larger than a total area of the second inclined surfaces, and
when at least one cross section of the reflective layer cut in the thickness direction is viewed, an angle of a normal line of each first inclined surface is −40° or more and −1° or less with reference to the normal line of the entrance plane.

5. The external light use type display body according to claim 1, wherein
the external light use type display body satisfies the Formula (1),
the $\theta_{dd-}$ is −25° or more and less than 0°, and
the $\theta_{dd+}$ is 0° or more and 25° or less.

6. The external light use type display body according to claim 1, wherein
the external light use type display body satisfies the Formula (2),
the $\theta_{dd-}$ is −38° or more and less than −13°, and
the $\theta_{dd+}$ is −13° or more and 19° or less.

7. The external light use type display body according to claim 2, wherein the patterned indented structure is a sawtooth structure in which when at least one cross section cut in the thickness direction is viewed, first inclined surfaces having a predetermined inclination and second inclined surfaces having an inclination different from that of the first inclined surfaces are alternately arranged.

8. The external light use type display body according to claim 7, wherein
when the reflective layer is viewed in a plan view, a total area of the first inclined surfaces is larger than a total area of the second inclined surfaces, and
when at least one cross section of the reflective layer cut in the thickness direction is viewed, an angle of a normal line of each first inclined surface is −40° or more and −1° or less with reference to the normal line of the entrance plane.

9. The external light use type display body according to claim 2, wherein
the external light use type display body satisfies the Formula (1),
the $\theta_{dd-}$ is −38° or more and less than −13°, and
the $\theta_{dd+}$ is −13° or more and 19° or less.

10. The external light use type display body according to claim 2, wherein
the external light use type display body satisfies the Formula (2),
the $\theta_{dd-}$ is −38° or more and less than −13°, and
the $\theta_{dd+}$ is −13° or more and 19° or less.

\* \* \* \* \*